UNITED STATES PATENT OFFICE.

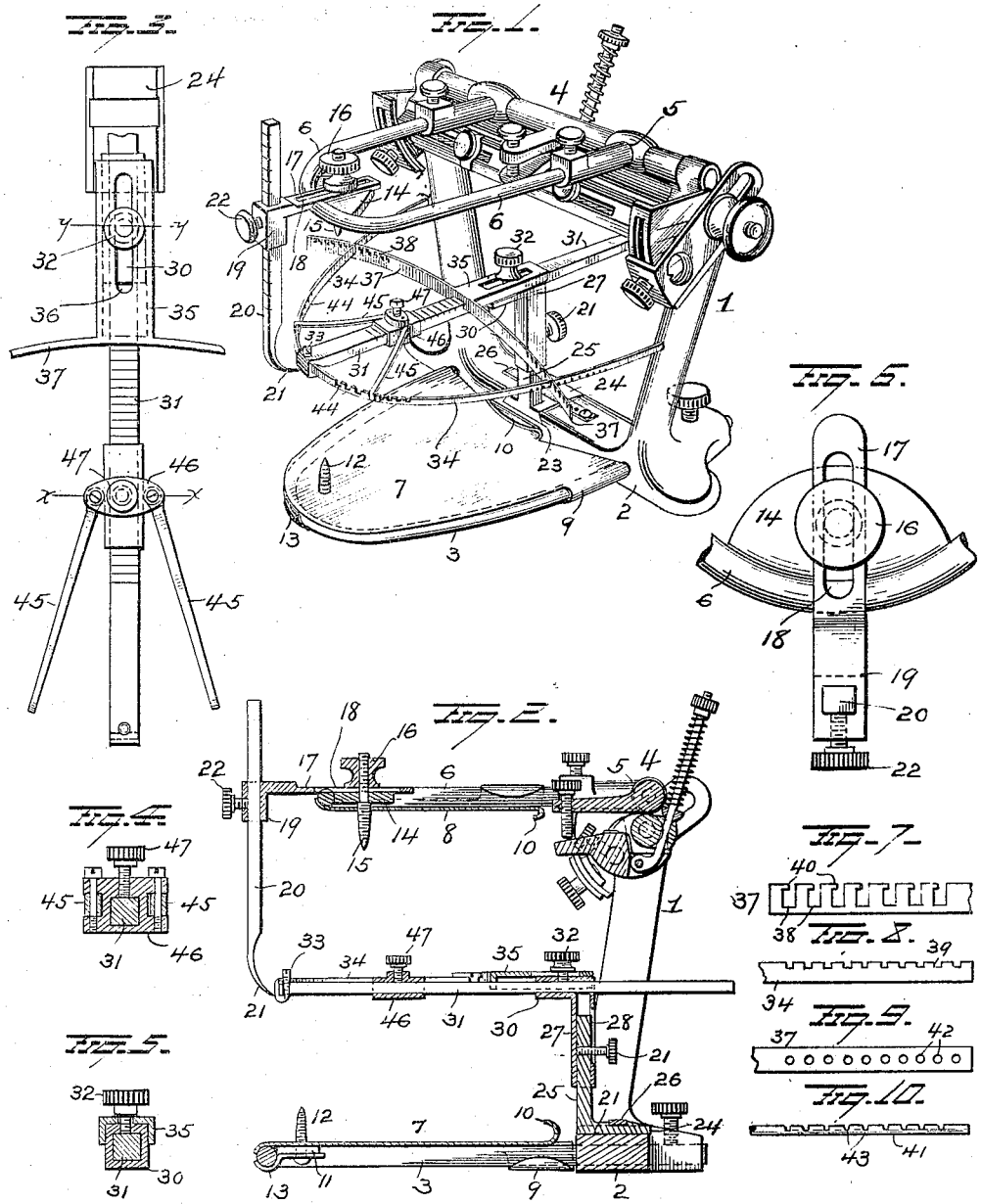

WILLIAM W. EVANS, OF HAMILTON, VIRGINIA.

ATTACHMENT FOR DENTAL ARTICULATORS.

1,050,933.      Specification of Letters Patent.      Patented Jan. 21, 1913.

Application filed September 18, 1912. Serial No. 721,047.

*To all whom it may concern:*

Be it known that I, WILLIAM W. EVANS, a citizen of the United States, residing at Hamilton, in the county of Loudoun and State of Virginia, have invented certain new and useful Improvements in Attachments for Dental Articulators; and I do hereby declare the following to be a full, clear, and exact description of the invention, such as will enable others skilled in the art to which it appertains to make and use the same.

This invention relates to improvement in attachments for dental articulators,—the object of the invention being to provide means to be employed on an articulator for facilitating the setting up of artificial teeth on a model in such manner that the scientific correctness of the location and spacing of the teeth shall be insured.

With this object in view, the invention consists in certain novel features of construction and combinations of parts as hereinafter set forth and pointed out in the claims.

In the accompanying drawings; Figure 1 is a perspective view of a dental articulator showing the application of my improvements thereto; Fig. 2 is a sectional view of the same; Fig. 3 is an enlarged plan view of a portion of the attachment; Fig. 4 is a sectional view on the line $x$—$x$ of Fig. 3; Fig. 5 is a sectional view on the line $y$—$y$ of Fig. 3; Fig. 6 is an enlarged detail view showing the connection of parts of the attachment with the upper model holder; Fig. 7 is an enlarged view of a portion of the cross-bar 37; Fig. 8 is an enlarged view of a portion of the spring bow 34; Fig. 9 is a view illustrating a modification of the cross-bar, and Fig. 10 is a view showing a modification of the cross bar.

1 represents the frame of a dental articulator provided in its base portion 2, with sockets to receive the removable lower model holder 3, and 4 represents the hinged head of the articulator provided with socketed arms 5 to receive the removable upper model holder 6.

The particular construction of the articulator is not essential as my improvements are adaptable for use with the various articulators now on the market, and hence a detail description of the articulator shown in the drawing is not necessary.

The models may be conveniently connected with the model holders by means of base plates 7 and 8 respectively. These plates conform in shape to that of the model holders and are provided with ears 9 to engage the rear portions of the arms of said model holders. Each plate is provided at its rear edge with a curved lip 10 to engage the material of the model. The lower plate 7 is provided near its front end with a block 11 through which a screw 12 passes upwardly, said screw passing also through the plate and projecting an appreciable distance above the same so as to enter the material of the model and assist in holding the same on the plate. The screw 12 serves also as a securing means for a clip 13 which engages the front end of the model holder.

The upper model holder 8 is provided at its front end with an inwardly-projecting lug 14, through which a screw 15 passes the lower portion of said screw also passing through the upper model plate and adapted to enter the material of the upper model. The screw 15 projects above the lug 14 and is provided with a nut 16 which serves to clamp a horizontal arm 17 to the upper model holder. This arm is made with an elongated slot 18 through which the screw passes, to permit adjustment of said arm. The arm 17 projects beyond the free end of the model holder 8, and at its free end, a vertical sleeve 19 is provided and is preferably made angular in cross section for the passage of a vertically adjustable rod 20 (also angular in cross section), said rod 20 being graduated in millimeters and provided at its lower end with a curved finger 21, which is intended to register the central position or median line of the models after they have been placed in the articulator, and also to retain the exact position of the lip line and the location of the mechanism (hereinafter described) for setting up the teeth in the models. The rod or gage 20 is held in the position to which it may be adjusted, by means of a set screw 22.

The base 2 of the articulator frame is provided in its upper face with a transverse dove-tail groove 23 for the reception of the base block 24 of a post 25, the latter being normally held against displacement by means of a spring 26 secured to the base 2 and engaging the notched upper face of the base block 24. A sleeve 27 is mounted upon the post 25 and provided with an elongated slot 28 for the passage of a set screw 21, the latter also passing through the post and engaging the opposite wall of the sleeve 27 for holding the latter at different vertical adjustments. The sleeve 27 is provided at its upper end with a horizontal tubular portion 30 (preferably angular in cross section) for the accommodation of a horizontal rod 31, a set screw 32 being provided to hold said rod at the proper adjustment. The front end of the rod 31 has attached thereto, by means of a screw 33, the intermediate portion of a flexible bow 34 constructed of spring metal. This bow may be made of a thin strip of tempered steel such as commonly employed in the manufacture of watch springs, although said bow may be constructed of spring wire as indicated in Fig. 10. A slide 35 is mounted upon the portion 30 of sleeve 27 and provided with an elongated slot 36 for the passage of the set screw 32 by means of which said slide can be held at any desired adjustment. The intermediate portion of a cross bar 37 is fixed to the front end of the slide 35 and this bar (which is curved as shown in Fig. 1) is provided near each of its ends with notches 38 to receive the arms of the flexible bow 34,—the latter being also provided with notches 39, so that when said arms of the bow are inserted into notches 38 of the cross bar, the tension of the bow will cause the arms thereof to spring slightly and become disposed under lugs 40 which overhang the notches 38, the notches 39 in the arms of the bow receiving said lugs, and thus the arms of the bow may be adjustably connected with the cross bar 37. When the flexible bow is constructed of wire (as shown at 41 in Fig. 10), the cross bar will be made with perforations 42 (as shown in Fig. 9) for the passage of said wire, the latter being in this case provided with notches 43 to engage the walls of the perforations in the cross bar. At respective sides of the connection of the rod 31 with the bow 34, the latter is provided with a plurality of notches 44, and the bow is engaged at such notched portion by the hooked front ends of arms 45. These arms are hinged to a slide 46 adjustably mounted on the rod 31 and held at any desired adjustment by means of a set screw 47. The rod 31 may be provided with a millimeter scale 31ᵃ if desired. The hinge connections of the arms 45 with the slide 46 are such as to permit said arms to be swung horizontally so that they may be caused to engage any of the notches 44, but said arms will preferably be made somewhat flexible so that they will spring into said notches and be prevented from slipping on the bow. The notches 39 and 44 are so located that they represent different sizes of artificial teeth now manufactured. The notches 44 on the bow represent different sizes of the space occupied by the six front teeth,— each succeeding notch rearwardly representing increased size of said space, and the rear notches 39 serve to determine the proper positions of the molars and the proper location of the cross bar to indicate the correct location of the last molar on each side.

Assuming that the models have been placed in position in the articulator, the operator will first adjust the gage rod 20 to determine the median line of the models and also the lip line as previously explained. This adjustment of the rod 20 will also determine the correct position to be occupied by the bow 34, as illustrated in Figs. 1 and 2. The proper elevation of the bow having now been determined and the bow having been secured at such elevation by tightening the set screw 21, the operator will proceed to adjust the connection of the hinged arms 45 with respect to the notched portions 44 of the spring bow 34, and in accordance with the sizes of the teeth to be set into the models. For example, if the teeth are the largest of those manufactured, the arms 45 will be connected with the bow at the rearmost notches 44, and if the teeth to be used in a particular case are of the smallest size manufactured, the arms 45 will be connected with the bow at the notches 44 nearest the rod 31. It is apparent that for teeth of intermediate sizes, the intermediate notches will be employed. The space on the bow between the connection of the two arms 45 therewith, indicates, in every case, the correct space which the six front teeth should occupy.

The position and space to be occupied by the six front teeth having now been determined, the operator will move the slide 46 on the rod 31, and this movement, being transmitted by the arms 45 to the front portion of the bow 34, will cause the same to be flexed in one direction or the other (according to the direction of movement of the slide 46), and in this way, the bow can be made to conform to the exact contour of that portion of the model which is to receive the teeth. The points of connection of the arms of the bow 34 with the cross bar 37 will be determined in the same way as the connection of the arms 45 with the front portion of the bow. For instance, if teeth of the largest size manufactured are to be used, the arms of the bow will be connected with the cross bar at the outermost notches 38 of the latter, and for teeth of other sizes, the connections between the bow and cross bar will be at other notches of the latter. The bow having been adjusted for the sizes of teeth to be employed and also to conform to the contour of the model, the operator will then move the cross bar in a manner to measure or determine the distance from the distal face of the cuspids to the distal surface of the last molar. The operator may now proceed to place the teeth in the model, being enabled to accurately locate the six front teeth in the space indicated by the connection of the arms 45 with the front portion of the spring bow, and the remaining teeth, between such connections of the arms 45 with the bow and the connection of the cross bar 37 with the bow. The bow 34 being adjusted to the median line between the models, which is coincident with the lip line, such position of the bow will indicate the proper length of the teeth, so that correct length and alining of the teeth will be insured.

Slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. An attachment for articulators, comprising a flexible bow, means for supporting and adjusting said bow to a median position between models in the articulator, and means associated with said bow for determining the positions in the models of different teeth of sets of different sizes.

2. An attachment for articulators, comprising means for determining the median line between models in the articulator, a horizontal flexible bow, means for adjusting said bow to a position coincident with said median line, and adjustable means associated with said bow for determining the correct positions of different teeth of sets of different sizes.

3. An attachment for articulators, comprising a horizontally disposed flexible bow, a vertically adjustable support for said bow for sustaining the latter in a position intermediate of the model holders of the articulators, and means associated with said bow for adjusting the same to the contour of models located in the articulator.

4. An attachment for an articulator, comprising a flexible bow having graduations indicating the location of teeth of sets of different sizes, adjustable means for sustaining said bow in a horizontal position between the model holders of the articulators, and adjustable means attached to said sustaining means and adapted to register with the graduations of the bow.

5. An attachment for an articulator, comprising a flexible bow provided with means for supporting said bow in a horizontal position between the model holders of the articulator, a slide on said supporting means, and arms connected with said slide and attachable to the bow in different positions at respective sides of the center thereof to determine the space to be occupied by the six front teeth of a set of teeth.

6. An attachment for an articulator, comprising a flexible bow, adjustable means for supporting said bow in a horizontal position between the model holders of the articulator, means for indicating in said bow the proper positions of teeth of sets of different sizes, and means for conforming said bow to the contour of a particular model.

7. An attachment for an articulator, comprising a flexible bow, means supporting said bow in a horizontal position between the model holders of the articulator, a slide mounted on said supporting means, arms hinged to said slide and attachable in different positions to the bow at respective sides of its center, and a cross bar on said supporting means and having adjustable connection with the arms of the bow.

8. The combination with an articulator, of adjustable devices located between the model holders of the articulator for determining the correct positions of different teeth of sets of different sizes.

9. The combination with an articulator, of means disposed between the model holders of the articulator for determining the correct spacing of teeth of sets of different sizes, and means for adjusting said means to position coincident with the median line between models on the model holders of the articulator.

10. The combination with an articulator having model holders of a vertically adjustable rod attached to one of the model holders for determining the median line between models on said model holders, a horizontally disposed flexible bow, means for supporting said bow and adjusting it to said median line, and means associated with said bow to determine the correct positions of teeth of sets of different sizes.

11. The combination with an articulator having model holders, of an arm projecting from one of said model holders, means for adjusting said arm horizontally, a vertically adjustable rod attached to said arm for determining the median line between models on said holders, and means adjustable to said median line for determining the location of teeth of sets of different sizes.

12. The combination with an articulator having model holders, of a horizontal rod between the model holders, vertically adjustable means for supporting said rod, a horizontally disposed flexible bow attached to its front end to the front end of said bow, means for adjusting said rod longitudinally, an adjustable cross bar on said rod, means for adjustably connecting the arms of the bow with said cross bar, a slide mounted on said rod, and arms attached to said slide and adjustably connected with the bow at respective sides of the connection of said bow with the rod.

In testimony whereof, I have signed this specification in the presence of two subscribing witnesses.

WILLIAM W. EVANS.

Witnesses:
R. S. FERGUSON,
S. G. NOTTINGHAM.